United States Patent [19]

Cassens, Jr.

[11] 4,001,029

[45] Jan. 4, 1977

[54] GUNNABLE REFRACTORY COMPOSITION

[75] Inventor: Nicholas Cassens, Jr., Pleasanton, Calif.

[73] Assignee: Kaiser Aluminum & Chemical Corporation, Oakland, Calif.

[22] Filed: Sept. 26, 1975

[21] Appl. No.: 617,262

[52] U.S. Cl. .................................. 106/67; 106/62; 106/38.27; 106/38.9; 266/280

[51] Int. Cl.² ................. C04B 35/68; C04B 35/02; B28B 19/00; B28B 7/28

[58] Field of Search ................. 106/DIG. 4, 67, 62, 106/38.27, 38.9; 266/280

[56] References Cited

UNITED STATES PATENTS

| | | | |
|---|---|---|---|
| 976,996 | 11/1910 | Fludder et al. ...................... | 106/62 |
| 1,442,413 | 1/1923 | Olsson et al. ......................... | 106/67 |
| 3,232,774 | 2/1966 | Kehl ..................................... | 106/58 |
| 3,625,721 | 12/1971 | Snyder et al. ................... | 106/67 X |
| 3,879,208 | 4/1975 | Cassens, Jr. ..................... | 106/62 X |

*Primary Examiner*—Winston A. Douglas
*Assistant Examiner*—William G. Wright
*Attorney, Agent, or Firm*—Paul E. Calrow; Malcolm McQuarrie

[57] ABSTRACT

A refractory composition suitable for nozzle gunning, particularly onto hot surfaces, is made from sized refractory aggregate, bentonite, aluminum sulfate, and hydrated lime. Preferably the weight ratio of aluminum sulfate to hydrated lime is about 2.7.

16 Claims, No Drawings

GUNNABLE REFRACTORY COMPOSITION

BACKGROUND OF THE INVENTION

This invention concerns refractory compositions, particularly such compositions as are suitable for nozzle gunning.

Refractory compositions for gunning through a nozzle wherein water or other tempering liquid is admixed with the dry composition just prior to projecting it onto a furnace wall or other structure are well known in the art. Such compositions must contain a bonding material which will react rapidly with the water and promote rapid build-up, with low rebound, of the refractory material as soon as it hits the surface upon which it is gunned. Also, as with other refractory products, it is desired that gunned refractories have reasonably high density, together with reasonable strengths, particularly at elevated temperatures.

Another desirable characteristic of nozzle gun mixes is that they be usable over a relatively wide water range. Achieving the correct amount of water addition requires skill on the part of the gun nozzle operator, and if the range from "too little" to "too much" is very narrow, it requires constant attention and skill to maintain the correct amount of water under practical gunning conditions. Hence, a gunning composition of relatively wide water range is desirable.

When the composition is to be gunned onto a hot surface, for example in repairing a hot furnace or other vessel, the gunned composition should adhere and stay in place without popping or exploding as it heats up to the furnace temperature.

As mentioned, many such gunning compositions are known in the art. For example, U.S. Pat. No. 3,232,774 discloses a nozzle gunning mix of dead burned magnesite, magnesium sulfate, for example Epsom salts or kieserite, and hydrated lime. Also, U.S. Pat. No. 3,879,208 discloses a refractory composition, which can be gunned, comprising refractory aggregate, fine magnesia, aluminum sulfate, and citric acid.

As will be evident from the following specification, the composition of the present invention uses bonding materials individually disclosed in the prior art, but in a unique combination which leads to improved characteristics, particularly wide water range and resistance to popping when hot gunned, compared with prior art compositions.

SUMMARY OF THE INVENTION

It has now been discovered, according to this invention, that a refractory gun mix of wide water range and reduced popping tendency when hot gunned is provided by a composition consisting essentially of (1) from about 1% to about 5% aluminum sulfate, (2) from about 0.5% to about 5% hydrated lime, (3) from about 0.5% to about 5% bentonite, the balance being (4) sized refractory grain, all percentages being by weight of the total composition.

DETAILED DESCRIPTION

The refractory grain or aggregate used in compositions of the present invention can be any such aggregate known in the art, for example periclase, chrome ore, mixtures of these two, aluminosilicate grain such as flint clay, calcined bauxite, mullite grain, and the like. Although the bond of this invention can be used with any refractory aggregate, it has been found that compositions containing at least 10% magnesia (MgO) show enhanced strength, and such compositions are accordingly preferred in applications where the inclusion of magnesia will not be detrimental.

The aggregate will be sized according to well known practices in the art to achieve maximum placed density and good flow through the gun. For example, it will all pass a 4 mesh screen, and 30% will pass a 100 mesh screen. In a preferred embodiment having good gunning characteristics, at least 10% of the aggregate will be magnesia material, for example dead burned magnesite or periclase, containing at least 90% MgO and passing a 100 mesh screen. A particularly preferred composition is one in which all the aggregate is a high MgO (i.e., over 90% MgO) aggregate such as dead burned magnesite or periclase.

The aluminum sulfate used is a standard article of commerce, and is used in relatively finely divided form, for example 35% or more passing a 100 mesh screen. The aluminum sulfate specified in the claims is that containing about 14 waters of hydration, $Al_2(SO_4)_3 \cdot 14 H_2O$, since this is the generally available material of commerce. However, it will be understood that while the numerical limits given in the specification and claims for aluminum sulfate refer to this specific material, if other aluminum sulfates are used having more or less water of hydration, a proportionate adjustment in the weight of the aluminum sulfate, and in the ratio of aluminum sulfate to hydrated lime, to account for the greater or lesser amount of water, will be made.

Hydrated lime, $Ca(OH)_2$, is also a standard material of commerce and is also used in finely divided form, for example all passing a 325 mesh screen.

Bentonite is a plastic clay generally available and well known in this art. It, too, is used in finely divided form, again substantially all passing a 325 mesh screen.

Generally, compositions according to this invention will be prepared by a refractories manufacturer by mixing the dry ingredients, for example in a rotating drum mixer, bagging them, and shipping to the ultimate user. The user will place the composition in conventional gunning apparatus wherein water, the amount of which can be varied by a water valve controlled by the gun operator, is mixed with the composition at the gun nozzle just prior to projection onto a hot furnace wall, for example.

Although the reason for the effectiveness of the present composition is not known with certainty, it is believed the aluminum sulfate and hydrated lime react according to the following equation:

$$Al_2(SO_4)_3 \cdot 14H_2O + 3Ca(OH)_2 \rightarrow 2Al(OH)_3 + 3CaSO_4 \cdot 2H_2O + 8H_2O \qquad (1)$$

It will be noted that the weight ratio of aluminum sulfate to hydrated lime (A/C ratio) in the above equation is about 2.7. It has been found that compositions with that A/C ratio have the most desirable properties.

However, the behavior of this composition is not so simple as suggested by the above equation, since it has been found that the bentonite affects the bonding reaction. As will be discussed below, reducing the amount of bentonite leads to a faster reaction (i.e., setting of the bond) and a narrower water range over which the composition guns well. In other words, the three bond components of the present composition interact to produce its desirable characteristics.

It will be understood that other known ingredients, for example pulverized or pelletized pitch, can be added to compositions according to this invention for certain applications, the pitch addition being one possibility in gunning BOF vessels.

EXAMPLES

Compositions A, B, C, and D, within the scope of this invention, were made up with the amounts of aluminum sulfate and hydrated lime shown in Table I, together with 2% bentonite, the balance being periclase refractory grain of the following typical chemical composition: 1.1% CaO, 2.1% $SiO_2$, 0.3% $Al_2O_3$, 0.4% $Fe_2O_3$, 0.3% $Cr_2O_3$ and (by difference) 95.8% MgO. The periclase grain was sized so that substantially all passed a 6 mesh screen, approximately 50% was retained on a 20 mesh screen, and 16% passed a 325 mesh screen. The aluminum sulfate was about 35% −100 mesh, and the hydrated lime and bentonite were all −325 mesh. The dry ingredients were mixed in a V-blender for 5 minutes, loaded into a laboratory nozzle mix gun, and gunned onto a cold surface with the addition of about 12% free water at the nozzle. All four compositions gunned well, with essentially equivalent rebounds. Other properties of these compositions are shown in Table I. Composition $B_h$ is an example of Composition B gunned at high water content and $B_l$ an example at low water content.

Per cent rebound was determined by weighing both the material built up on the surface ("build-up") and the material which did not adhere to the surface ("rebound") after drying at 150° C and applying the formula $$\text{Per cent Rebound} = \frac{\text{rebound}}{\text{rebound} + \text{build-up}} \times 100 \qquad (2)$$

water figure. However, it will be apparent that this factor is relatively constant from composition to composition, and that the free water figures given can be compared with each other.

Compositions E, F, G, H, J, and K, also within the scope of this invention, demonstrate the effect of varying the amount of bentonite in the composition. Each contained 2.18% aluminum sulfate, 0.82% hydrated lime, and the amount of bentonite shown in Table I, the balance of the composition being the refractory grain used in Compositions A, B, C, and D. While all six compositions gunned well, with reasonable water range, Composition K, with only 0.5% bentonite, showed a narrower water range than the other compositions, and compositions J and K (1.0 and 0.5% bentonite, respectively) showed a faster bond reaction than the other four compositions. It may be noted that the A/C ratio of all six compositions was about 2.7.

Comparison Compositions L, M, and N, not within the scope of this invention, were gunned to compare the behavior of compositions according to this invention with similar compositions wherein magnesium sulfate was used instead of aluminum sulfate. Compositions L, M, and N were made with 2% bentonite and the indicated percentages of hydrated lime and Epsom salts, the balance being the size periclase grain described above. Although these compositions gunned well, the water range over which they could be gunned ranged from narrow to very narrow.

Although assessment of the width of the water range over which a composition can be gunned is a somewhat subjective evaluation by the operator, a determination of the amount of water in material gunned at the minimum and maximum acceptable amounts of water indicates that a material with a "very good" water range can be gunned over a range of free water contents of 15 to 20 percentage points or, in other words, that a varia- Table I

| Composition | A | B | $B_n{}^1$ | $B_l{}^2$ | C | D | E | F | G | H | J | K | L | M | N | P | Q |
|---|---|---|---|---|---|---|---|---|---|---|---|---|---|---|---|---|---|
| Aluminum Sulfate (%) | 2.25 | 2.2 | 2.2 | 2.2 | 1.2 | 1 | 2.18 | 2.18 | 2.18 | 2.18 | 2.18 | 2.18 | — | — | — | 2.2 | 2.2 |
| Hydrated Lime (%) | 0.75 | 0.8 | 0.8 | 0.8 | 1.2 | 2 | 0.82 | 0.82 | 0.82 | 0.82 | 0.82 | 0.82 | 0.70 | 0.63 | 1.20 | 0.8 | 0.8 |
| A/C ratio | 3 | 2.75 | 2.75 | 2.75 | 1 | 0.5 | 2.67 | 2.67 | 2.67 | 2.67 | 2.67 | 2.67 | — | — | — | 2.75 | 2.75 |
| Bentonite (%) | 2 | 2 | 2 | 2 | 2 | 2 | 2.0 | 1.8 | 1.5 | 1.2 | 1.0 | 0.5 | 2 | 2 | 2 | 2 | 2 |
| Magnesium Sulfate (%) | — | — | — | — | — | — | — | — | — | — | — | — | 2.30 | 2.37 | 1.20 | — | — |
| Free Water (%) | 12.5 | 12.2 | 18 | 4 | 11.6 | 11.6 | 14.2 | 11.2 | 11.5 | 10.8 | 9.5 | 10.0 | 10.8 | 11.4 | 12.7 | 17 | 17 |
| Water range[3] | G-VG | VG | — | — | G | VG-G | VG | G-VG | G | G | G | G-N | N | VN | N | G | G-VG |
| Build-up (inches) | 5 | 5 | 4 | 2.5 | 5 | 5 | 5 | 5 | 5 | 5 | 5 | 5 | 5 | 5 | 5 | 4 | 5 |
| Rebound (%) | 17 | 12 | 14.8 | 82.2 | 12 | 14 | 14 | 12 | 16 | 19 | 25 | 18 | 20 | 14 | 14 | 33 | 18 |
| Bulk Density (pcf)[4] | 144 | 142 | 134 | 138 | 144 | 144 | 143 | 140 | 145 | 148 | 148 | 148 | 145 | 146 | 145 | 159 | 122 |
| App. spec. gravity[4] | 3.44 | 3.44 | 3.41 | 3.51 | 3.31 | 3.43 | 3.21 | 3.45 | 3.48 | 3.46 | 3.46 | 3.48 | 3.48 | 3.46 | 3.46 | 3.86 | 3.22 |
| App. porosity (vol %)[4] | 33 | 34 | 37 | 37 | 30 | 33 | 28 | 35 | 33 | 33 | 31 | 32 | 33 | 32 | 33 | 34 | 39 |

[1]Composition B gunned a high (18%) water content.
[2]Composition B gunned a low (4%) water content.
[3]VG = very good; G = good; N = narrow; VN = very narrow.
[4]Determined after heating to 1093° C.

The term "free water" is used to refer to the amount of water added to the gun mix at the nozzle since it is determined by drying gunned material at 150° C for 12 hours. Any of the added water which reacts with material in the gun mix, for example the magnesia, to form hydrated compounds will probably not be driven off at this temperature. Accordingly, there is a small, relatively constant portion, for example 1 to 2%, of the water actually added which is not included in the free tion of ± 7–10% from the optimum can be tolerated. Similarly, a composition rated as having a "good" water range can be gunned over a range of 8 to 15 percentage points (± 4–7% from the optimum), while a composition with a "narrow" water range can be gunned only over a range of 4 to 8 percentage points (± 2–4% from the optimum), and a composition with a "very narrow" water range can be gunned over a range of less than 4 percentage points (± 2% from the optimum). Compositions with a very narrow water range require constant adjustment of the water valve to maintain a proper water content.

It will be understood by those skilled in the art that the specific values of water contents which can be used with a given composition will vary with many factors, for example the particular bonds used, the sizing of the composition, as well as such extrinsic factors as temperature and relative humidity in the area where gunning takes place. However, the numbers given above are consistent for a given type of composition, e.g., the compositions described in Table I, gunned under similar conditions. It will be understood that the amount of water added to gunning compositions is not controlled by measuring the per cent of water added, but rather by adjusting a water valve so that the amount of water added at the nozzle results in good gunning, principally low rebound.

More specifically with respect to the present invention, a series of experiments were conducted in order to place quantitative values on the range of water contents over which such compositions could be gunned. Accordingly, Composition B was gunned at various free water contents, determined after drying at 150° C, from 2.8% to 17.7% with resulting rebounds ranging from a high of 97.5% at the lowest water content, through a minimum of 14.8% at 13.5% added water, to a high of 19.3% at the highest amount of water added. From the curve obtained when these values of rebound are plotted against water content, and selecting the criterion of 50% or less rebound for good gunning, it is estimated that the water range for good gunning of this composition is from 7 to 24% water. Obviously an operator will attempt to gun at the optimum amount of water, that is to say with minimum rebound and good adherence to the wall without slumping. However, the very wide water range of the present composition allows for variations or surges in the gunning operation due to water pressure changes, variations in the flow of refractory material through the gun, and other factors.

Although the cold gunning described above is good for screening a large number of compositions, the ultimate test of these compositions is to gun them onto hot furnace walls. Such gunning onto a surface preheated to 1300° C was done with Compositions A, C, D, E, G, J, and K. The main characteristic looked for in the hot gunning tests was whether or not the composition exhibited what is known as "popping", the tendency for sections of the gunned refractory to explosively part from the gunned mass. Obviously, the less popping, the better.

Composition D popped upon hot gunning, whereas Composition E exhibited shallow, delayed popping. On the other hand, Composition A showed very little, and very shallow, popping. From this, it can be concluded that a higher A/C ratio leads to less popping when these compositions are hot gunned. Compositions G, J, and K, with reduced bentonite contents, showed delayed, shallow popping similar to that of Composition E.

Composition P, the same as B except that the periclase was replaced with Masinloc chrome ore of the same sizing, was made. A typical chemical composition of the chrome ore used is: 21% MgO, 1% CaO, 6% $SiO_2$, 28% $Al_2O_3$, 14% $Fe_2O_3$ and 30% $Cr_2O_3$. This composition gunned well, despite mechanical difficulties with the gun, onto a cold surface with 33% rebound using 17% water at the gun nozzle. The gunned composition had the properties shown in Table I.

The use of the bond of this invention with an aluminosilicate composition is illustrated by Composition Q which contained 15% flint clay passing a 3 mesh screen, 55% calcined bauxite passing a 6 mesh screen, 5% pulverized calcined bauxite, 20% plastic fire clay, 2.2% aluminum sulfate, 0.8% hydrated lime, and 2% bentonite. This composition gunned very well onto a cold surface when mixed with 17% free water at the gun nozzle, and showed 18% rebound. The gunned material had the properties shown in Table I.

A comparison composition the same as Q but with 5% CA-25 cement instead of the aluminum sulfate, hydrated lime, and bentonite had 43% rebound when gunned with 14.5% free water.

In the specification and claims, percentages and parts are by weight unless otherwise indicated, except that porosities are expressed in volume per cent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g. MgO and $SiO_2$, although the components may actually be present in various combinations, e.g. as a magnesium silicate.

What is claimed is:

1. A refractory composition suitable for gunning by the method wherein water is admixed with the composition in a gun nozzle and particularly adapted for gunning onto hot surfaces, consisting essentially of (1) from about 1% to about 5% aluminum sulfate, (2) from about 0.5% to about 5% hydrated lime, (3) from about 0.5% to about 5% bentonite, the balance being (4) sized refractory grain, all percentages being by weight of the total composition.

2. Composition according to claim 1 wherein the weight ratio of aluminum sulfate to hydrated lime is from about 2 to about 3.

3. Composition according to claim 2 wherein the weight ratio of aluminum sulfate to hydrated lime is about 2.7.

4. Composition according to claim 1 wherein the sized refractory grain is basic refractory grain.

5. Composition according to claim 4 wherein the weight ratio of aluminum sulfate to hydrated lime is from about 2 to about 3.

6. Composition according to claim 5 wherein the weight ratio of aluminum sulfate to hydrated lime is about 2.7.

7. Composition according to claim 1 wherein at least 10%, based on the total weight of the composition, of the refractory grain is magnesia.

8. Composition according to claim 7 wherein the weight ratio of aluminum sulfate to hydrated lime is from about 2 to about 3.

9. Composition according to claim 8 wherein the weight ratio of aluminum sulfate to hydrated lime is about 2.7.

10. Composition according to claim 4 wherein the sized refractory grain is periclase containing at least 90% MgO.

11. Composition according to claim 10 wherein the weight ratio of aluminum sulfate to hydrated lime is from about 2 to about 3.

12. Composition according to claim 11 wherein the weight ratio of aluminum sulfate to hydrated lime is about 2.7.

13. Composition according to claim 10 containing about 2.2% aluminum sulfate, about 0.8% hydrated lime, and about 2% bentonite.

14. Composition according to claim 1 wherein the sized refractory grain is aluminosilicate grain.

15. Composition according to claim 14 where the weight ratio of aluminum sulfate to hydrated lime is from about 2 to about 3.

16. Composition according to claim 15 wherein the weight ratio of aluminum sulfate to hydrated lime is about 2.7.

* * * * *